Sept. 29, 1953     L. M. SALMON     2,653,655
WHIRLING FLAME SPINNER
Filed Jan. 9, 1952     2 Sheets-Sheet 1
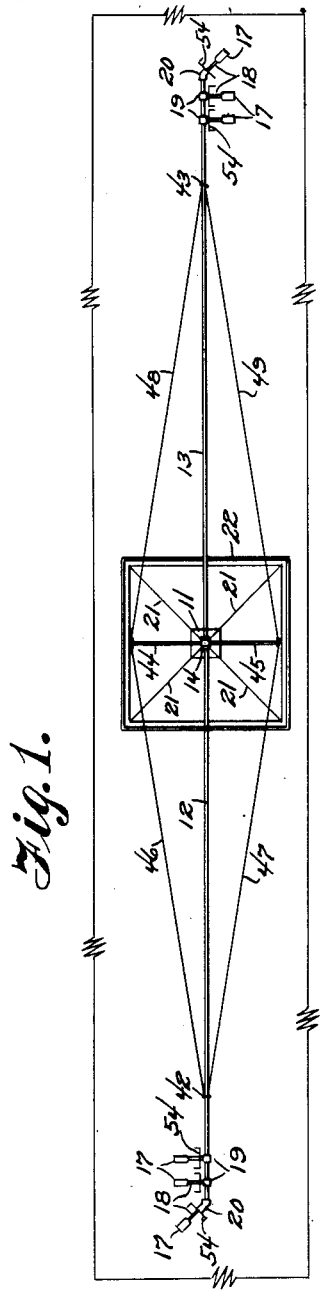
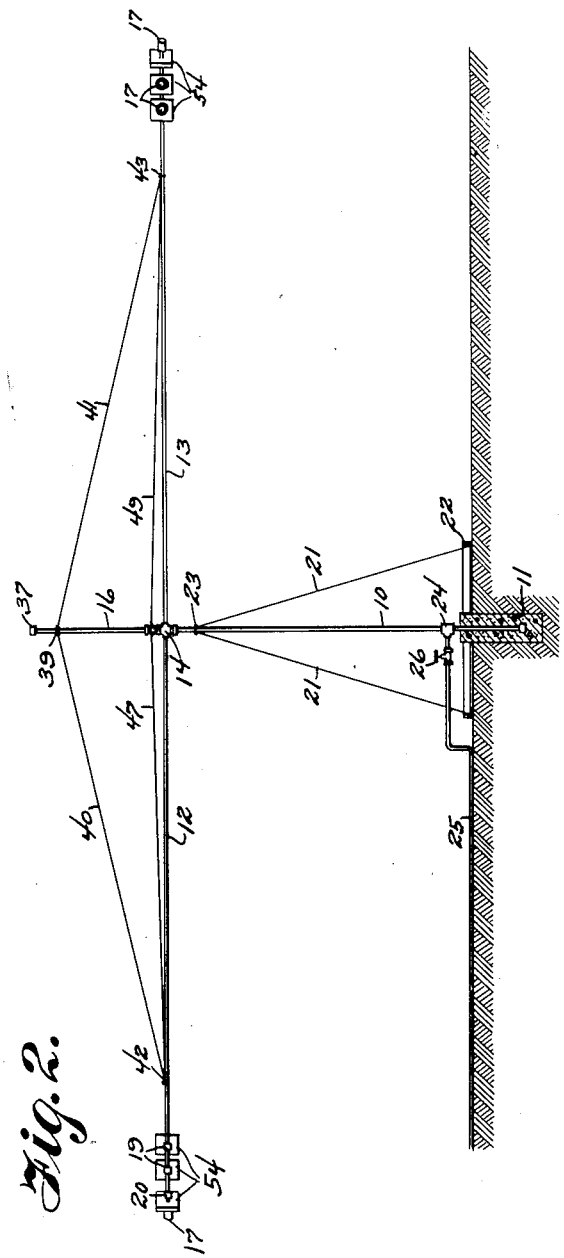
INVENTOR.
Leonard M. Salmon
BY Victor J. Evans & Co.
ATTORNEYS Sept. 29, 1953
L. M. SALMON
2,653,655
WHIRLING FLAME SPINNER
Filed Jan. 9, 1952
2 Sheets-Sheet 2
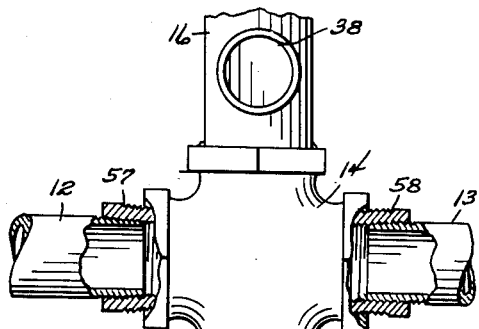
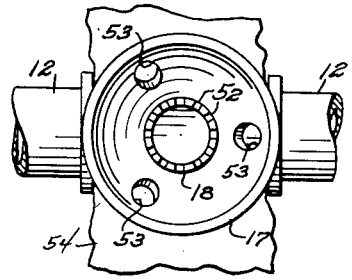
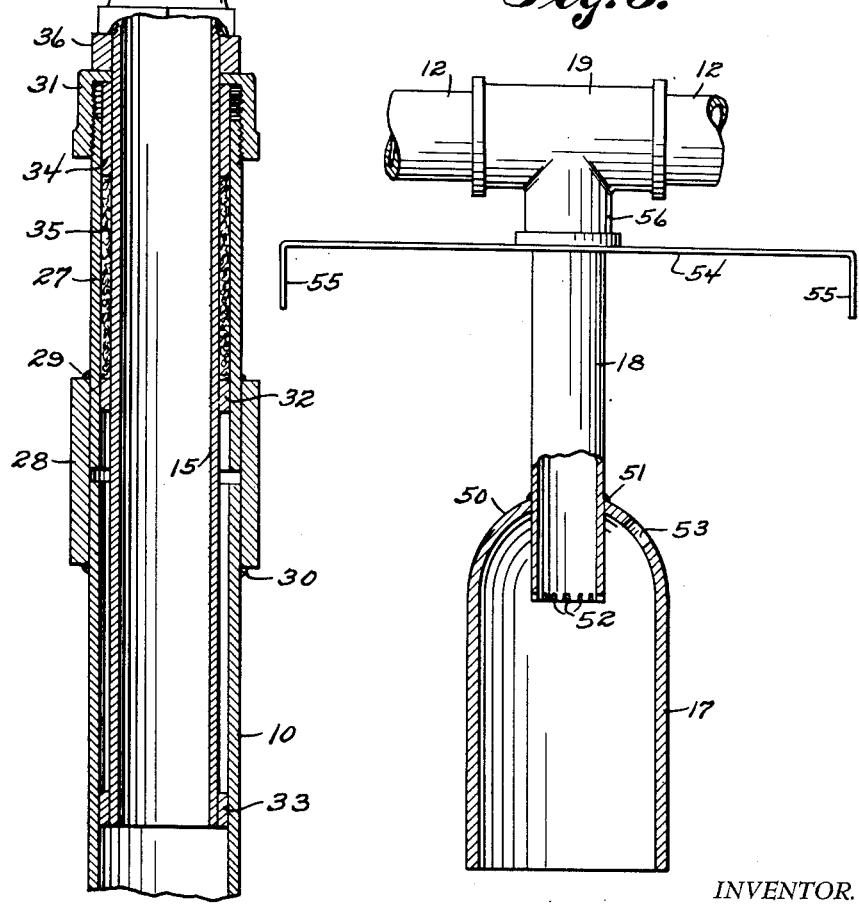
INVENTOR.
Leonard M. Salmon
BY Victor J. Evans & Co.
ATTORNEYS Patented Sept. 29, 1953

2,653,655

UNITED STATES PATENT OFFICE 2,653,655

WHIRLING FLAME SPINNER

Leonard M. Salmon, McAllen, Tex.

Application January 9, 1952, Serial No. 265,697

1 Claim. (Cl. 158—99)

This invention relates to spraying devices used primarily for spraying fuel for producing a whirling flame and which are also used for spraying insecticides and fertilizers and overhead sprinkler and irrigation systems, and in particular a spinner having outwardly extended arms with spray nozzles on the ends journaled in a vertically disposed pipe or post and having means for sealing the upper end of the post whereby fluids under pressure may be supplied to the nozzles on the ends of the arms through the post.

The purpose of this invention is, primarily, to provide a rotating element or spinner for spraying fuel to provide a whirling flame for maintaining the temperature of an area in which fruit trees and the like are positioned, to prevent freezing.

Various devices have been used to spray fuel to facilitate burning and other devices such as smudge pots have been used in orchards to prevent freezing, however, in extreme conditions it is desirable to prevent freezing of valuable crops to provide a whirling flame that covers a comparatively large area and that raises the temperature sufficiently to prevent freezing of fruit and the like. With this thought in mind this invention contemplates a post having a spinner with outwardly extended arms journaled in the upper end thereof and provided with sealing means whereby fluids under pressure are supplied to nozzles carried by extended ends of the arms through the post and arms.

The object of this invention is, therefore, to provide means for mounting a spinner having outwardly extended arms on the upper end of a tubular post whereby with the spinner journaled in the end of the post sufficient packing may be incorporated in the journaling means to prevent the escape of fluids under pressure through the journaling means.

Another object of the invention is to provide a whirling flame producing device which is also adapted for sprinkler and irrigation systems and for broadcasting insecticides and fertilizers.

A further object of the invention is to provide a whirling flame spinner mounting which is of a comparatively simple and economical construction.

With these and other objects and advantages in view the invention embodies a tubular post rigidly mounted in a footing and provided with bracing elements, a tube journaled in the upper end of the post and extended upwardly therefrom, tubular arms having spray nozzles on the ends extended from the tube journaled in the upper end of the post, means supporting the arms from the tube, means sealing the journaling means, and means supplying fluid under pressure to the post, tube and tubular arms.

Other features and advantages of the invention will appear from the following description taken in connection with the drawings, wherein:

Figure 1 is a plan view illustrating the improved spinner mounting.

Figure 2 is a side elevational view of the spinner mounting showing an anchoring footing of the post of the spinner in section.

Figure 3 is a vertical section through the bearing and sealing means therefor for journaling the spinner in the upper end of the post, showing the parts on an enlarged scale and also with some of the parts shown in elevation.

Figure 4 is a view looking upwardly toward the lower end of one of the nozzles showing the device with a shield positioned around the upper end of the nozzle omitted.

Figure 5 is a detail showing an elevational view of the mounting of one of the nozzles and illustrating a nozzle depending from the mounting, the nozzle and the immediate portion of a pipe from which the nozzle extends being shown in section.

Referring now to the drawings wherein like reference characters denote corresponding parts the improved whirling flame spinner of this invention includes a vertically disposed tubular post 10, anchored in a footing 11, with tubular arms 12 and 13 extended from a fitting 14 journaled on the upper end of the post 10 with a bearing tube 15 extended downwardly into the post and having a supporting tube 16 extended upwardly therefrom, and a plurality of nozzles 17 carried by tubes 18 extended from fittings 19 and 20.

As illustrated in Figure 2, the lower end of the post 10 is cast in a footing 11 which provides an anchor rigidly supporting the post and the post is further secured in an upright position with guy wires 21 extended from the corners of a frame 22 and connected to the post 10 at the point 23.

The lower part of the post is provided with a fitting 24 to which a supply tube 25 is connected and the tube 25 is provided with a valve 26.

The upper end of the post 10 is provided with a tubular section 27 connected to the post with a connector 28, the ends of which are secured, preferably by welding, as indicated at the points 29 and 30 to the extending section and post, respectively and a cap 31 is threaded on the upper end of the section 27.

The bearing tube 15 is provided with journaling rings 32 and 33 of brass or other suitable material and a similar band 34 is provided at the upper end. A packing of graphite, as indicated by the numeral 35 or other suitable material is positioned between the ring 32 and the band 34. A sealing ring 36 is also provided between the upper end of the cap 31 and the fitting 14 whereby with the parts assembled as shown the connection between the spinner and post is substantially sealed.

The tube 16 extends upwardly from the fitting 14 and the upper end is provided with a top cap 37. The lower part of the tube 16 is provided with a connection 38 for a cross arm or the like, and a collar 39 on the upper part of the tube 16 provides means for connecting supports 40 and 41, which extend from points 42 and 43, respectively on the arms 12 and 13 to the upper part of the tube 16. Cross arms 44 and 45 also extend from the connection 38 of the tube 16 and the ends thereof are connected to arms 12 and 13 at the points 42 and 43 with supporting wires 46 and 47 at one side and 48 and 49 at the other.

The nozzles 17 are formed as illustrated in Figure 5, with tubular shelves having open lower ends and with the walls at the upper ends converging to provide substantially semi-spherical inner ends, as indicated by the numeral 50. The sections 18 of the supply tubes 12 and 13 extend into the closed ends of the nozzles and the nozzles are secured thereto by welding as indicated by the numeral 51. The tubes 18 are provided with serrated ends 52 and the closed ends of the nozzles are provided with openings 53.

Each nozzle is provided with a square shield 54 of aluminum or the like and the shields are provided with flanges 55. As illustrated in Figure 5 the shields are positioned against the ends of branch connections 56 of the fittings 19 and 20.

It will be understood that as many nozzles as may be desired may be carried by the arms, and in the design shown in Figure 1, two nozzles extend straight outwardly and single nozzles at the ends extend from a supply tube at an angle, preferably of 45 degrees. With the nozzles positioned in this manner, fluid ejected therefrom under pressure creates a jet action which causes the arms comprising the spinner to rotate. The rotating nozzles provide a whirling flame which supplies heat to a comparatively large area around the device.

It will also be understood that the device may be used for spraying insecticides and fertilizer and may also be used for irrigation purposes.

The sprinkler of this invention is illustrated as being provided with two of the supply tubes, such as the tubes 12 and 13, and these tubes are mounted with bushings 57 and 58 in side connections of the fitting 14, however, it will be understood that as many of the supply tubes, as may be desired, may be used.

It will be understood that modifications may be made in the design and arrangement of the parts without departing from the spirit of the invention.

What is claimed is:

A whirling flame spinner comprising a vertically disposed tubular post, a four way fitting having flanges about the openings therein, a tube in one of the openings extended downwardly from the fitting into the post, a cap on the post through which the tube extends, a plurality of journalling rings between the tube and post, one at the upper end of the post in engagement with the cap, one intermediate of the ends of the tube and one at the lower end of the tube, packing between the tube and post intermediate of the ring at the upper end of the post and the intermediate ring on the post for sealing the tube and post, a sealing ring about the tube intermediate of the flange on the coupling and the cap, tubular arms extending from the two oppositely disposed openings of the coupling, a plurality of horizontally disposed cup shaped nozzles having open and closed ends carried by the ends of each of the tubular arms, means for supplying fluid under pressure to said post and short sections of tubing between the closed ends of the nozzles and the arms.

LEONARD M. SALMON.

References Cited in the file of this patent

UNITED STATES PATENTS

| Number | Name | Date |
| --- | --- | --- |
| 1,016,109 | Stephens | Jan. 30, 1912 |
| 1,180,526 | Partridge | Apr. 25, 1916 |
| 1,845,364 | Thompson | Feb. 16, 1932 |